United States Patent [19]

Farr

[11] 3,927,560

[45] Dec. 23, 1975

[54] MOMENT DESENSITIZATION OF LOAD CELLS

[75] Inventor: Emory W. Farr, West Covina, Calif.

[73] Assignee: Transducers, Inc., Whittier, Calif.

[22] Filed: Dec. 20, 1973

[21] Appl. No.: 426,895

[52] U.S. Cl. .............................. 73/141 A; 177/211
[51] Int. Cl.² ......................................... G01L 1/22
[58] Field of Search ........... 73/141 A, 1 B; 177/211; 338/5

[56] References Cited
UNITED STATES PATENTS

| | | | |
|---|---|---|---|
| 2,704,452 | 3/1955 | Federn | 73/88.5 R |
| 3,439,761 | 4/1969 | Laimins | 177/211 |
| 3,576,128 | 4/1971 | Lockery | 73/141 A |
| 3,788,411 | 1/1974 | Oxley | 177/211 |

Primary Examiner—Charles A. Ruehl
Attorney, Agent, or Firm—Christensen, O'Connor, Garrison & Havelka

[57] ABSTRACT

A parallelogram beam-type load cell for measuring shear force of static loads. Located at specified positions on the load cell are a plurality of strain gauges connected to form an electrical bridge network. One dimension of the beam is reduced at predetermined beam locations where strain gauges comprising a specified one-half of the bridge network are situated. Such a beam-type load cell is insensitive to bending moments caused by the load. The location and dimensions of the reduced beam portion depend upon the original configuration of the beam and the response characteristics of the strain gauges.

13 Claims, 5 Drawing Figures

MOMENT DESENSITIZATION OF LOAD CELLS

BACKGROUND OF THE INVENTION

This invention relates primarily to the art of load cells, and more particularly, to improvements in beam-type load cells, the improvements relating to desensitization of the beam load cell to bending moment strain caused by the load to be measured.

Heretofore, it has been well-known to utilize transducive electrical strain gauges to measure the shear stress caused by applied loads. The transducive effect of a strain gauge allows for accurate translation between a given amount of stress imposed on a surface by a load and its electrical equivalent, resulting in an accurate stress measurement. Foil, semiconductor, or other types of strain gauges may be effectively used to provide such shear stress measurements. Typically, the strain gauges are connected into a Wheatstone bridge network to provide the correct output. The parallelogram beam load cell was devised to support a load bearing platform in such a manner that, theoretically, the strain gauges located on the load cell would only be affected by the shear force of the load on the platform. Using such a structure, the output of the bridge network would thus be the result of load shear force only, and would be insensitive to the load bending moment, regardless of the load position on the platform.

It has been found, however, that while the abovedescribed parallelogram beam-type load cell does compensate for differences in load orientation and size, and is thus relatively insensitive to load bending moments, such sensitivity has not been entirely eliminated. Furthermore, it has been discovered that this continued sensitivity to bending moments, and the resulting force measurement errors, are caused by a number of factors, including differences in measurement sensitivity between the individual strain gauges, guage placement on the beams, and dimensional inconsistencies between the parallelogram beams. U.S. Pat. No. 3,576,128 to Lockery recognizes these errors. It is at least these three identified sources, and perhaps other sources of secondary errors not now recognized, which are responsible for continued sensitivity of the load cell to the load bending moment. It is, of course, highly desirable that as much of this sensitivity to bending moment force as possible be eliminated from the operation of the load cell, such that the output of the load cell is an accurate measurement of only the load shear force.

In accordance with the above, a general object of the present invention is to overcome the disadvantages of the prior art.

It is another object of the present invention to provide a beam load cell which is insensitive to bending forces caused by a load being measured.

It is a further object of the present invention to reduce the effect of response differences between strain gauges on the value of load shear force.

It is a still further object of the present invention to provide a beam load cell which is insensitive to bending moments without changing the effective resistances of the individual strain gauges.

It is yet another object of the present invention to reduce the effect on the measurement of load shear force of differences between physical placement of the strain gauges on the beam and differences between the dimensional configurations of the beams.

It is another object of the present invention to inexpensively desensitize a beam load cell to load bending moments through mechanical means.

SUMMARY OF THE INVENTION

Accordingly, the present invention includes a parallelogram beam-type load cell, providing suitable mounting surfaces for a plurality of electrical strain gauges, wherein each of the beams includes a cutout portion in at least one surface thereof, the cutout portion being located in the vicinity of one of the strain gauges positioned on each beam. The cutout portion changes the response its associated strain gauge makes such that the load cell in operation is responsive substantially only to the shear force exerted by the load.

DESCRIPTION OF THE DRAWINGS

A more thorough understanding of the invention may be obtained by a study of the following detailed description taken in connection with the accompanying drawings, in which.

DESCRIPTION OF THE PREFERRED EMBODIMENT

Figure 1:
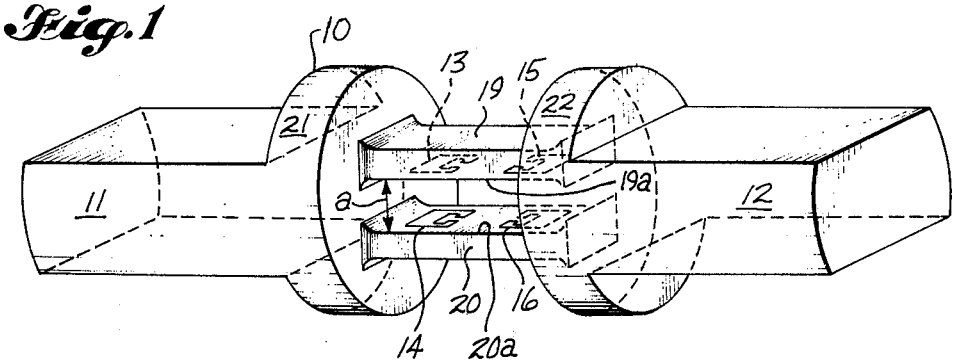
FIG. 1 is a diagram of a conventional beam-type load cell.
Figure 3:
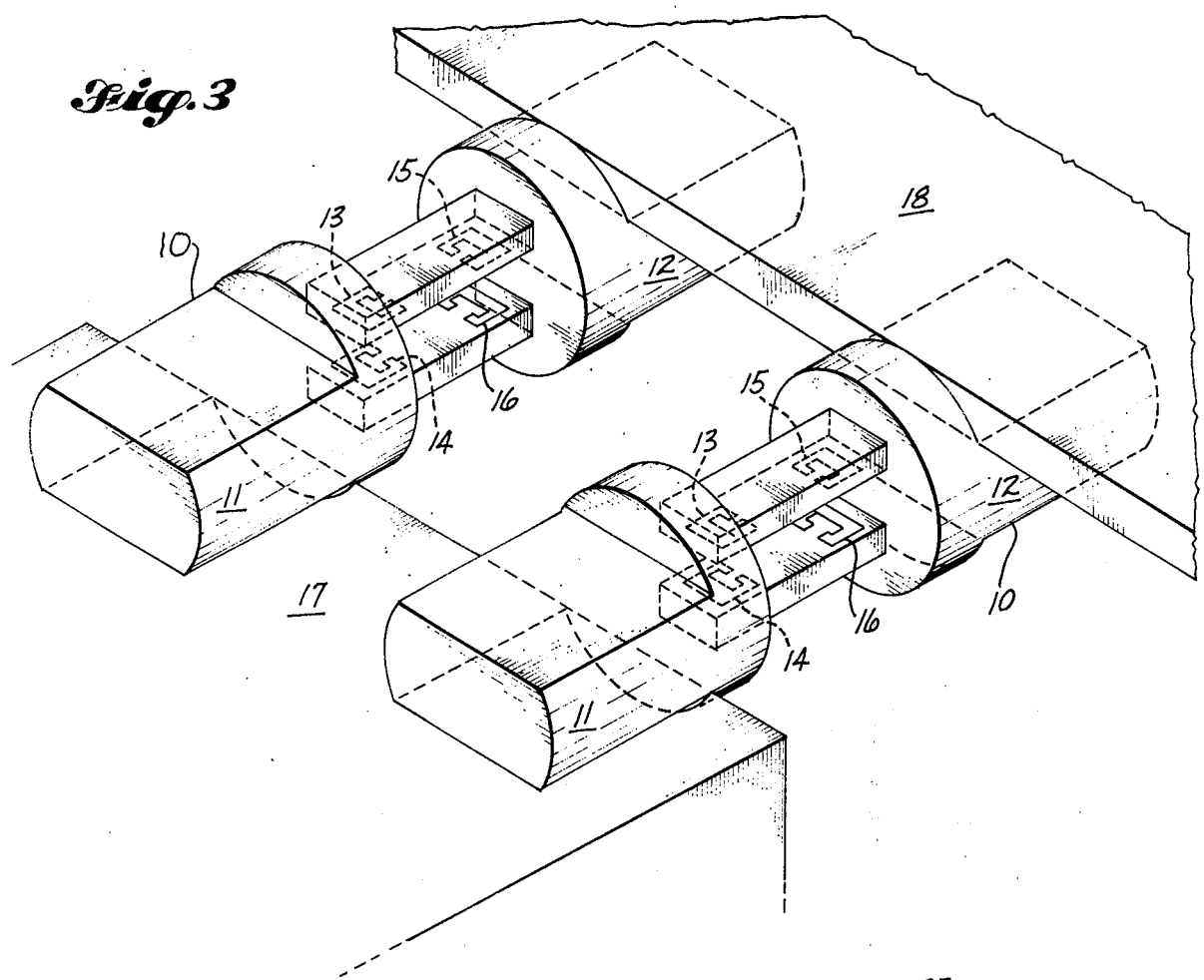
FIG. 3 is a diagram showing multiple parallelogram beam-type load cells supporting a load bearing platform.

Referring to FIGS. 1 and 3, a conventional parallelogram beam-type load cell 10 is shown. In typical operation, one end portion 11 of the load cell 10 is secured to a stationary support 17 (FIG. 3) while the other end 12 supports a load bearing platform 18. A load (not shown) is positioned on platform 18, and exerts a force on the platform which is measured by an electrical bridge network (FIG. 4), comprising strain gauges 13, 14, 15, 16 of load cell 10.

Before the development of parallelogram beam-type load cells, the position of the load on platform 18 relative to the individual load cells affected the force measurement of the load cell. To an extent, the beam load cell has reduced this type of error. The parallelogram beam-type load cell has many conventional configurations, and FIG. 1 shows beams 19 and 20 positioned longitudinally between two cylindrical portions 21 and 22, which are in turn integral with the two end portions 11 and 12. Beams 19 and 20 are solid bars of any desired material and are separated by a given distance $a$. The four strain gauges 13, 14, 15 and 16 are positioned on surfaces 19a and 20a of the beams 19 and 20. Gauges 13 and 16 measure compression surface strains while gauges 14 and 15 measure tension surface strains. The four guages are connected into a Wheatstone bridge arrangement (FIG. 4) with the bridge circuit being energized by a battery 25. The resultant electrical output of the bridge representative of the shear stress caused by a load appears at connections 26 and 27.

Figure 5:
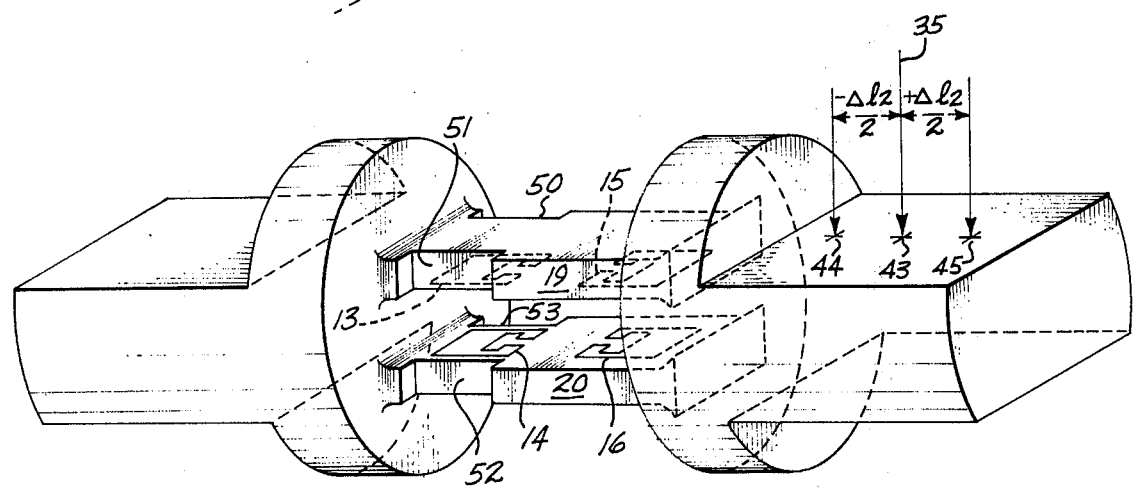
FIG. 5 is a parallelogram beam-type load cell utilizing the principles of the present invention.

However, as discussed above, the parallelogram beam-type load cell typically provides erroneous shear force readings, due to differences in strain gauge configuration, placement of the strain gauges on the beams, and the configuration of the beams. To offset these errors, and thus provide a more accurate reading of the load shear force, a portion of one dimension of the two beams 19 and 20 is reduced by machining, as shown in FIG. 5. Both beams are similarly machined, at either end thereof, depending upon the type of error introduced by the original load cell configuration. By so machining each beam, errors in shear force reading introduced by bending moments caused by differences in beam configuration, and strain gauge configuration and location, are compensated for, and a more accurate shear force reading is obtained. The location and dimensions of the machined portions are determined by the original beam configuration and strain gauge arrangement.

Figure 2:
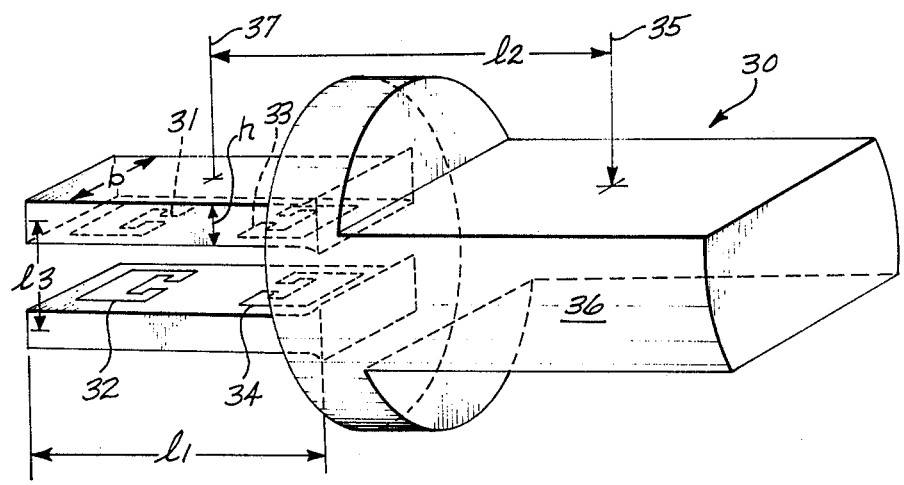
FIG. 2 is a diagram showing partially a parallelogram beam-type load cell.
Figure 4:
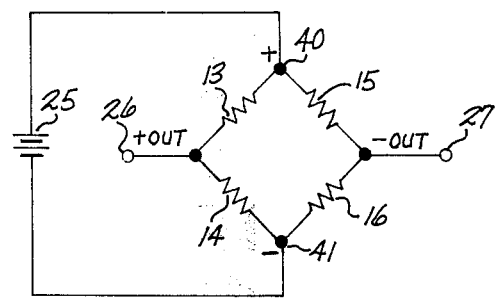
FIG. 4 is a diagram of the electrical bridge circuit of the present invention.

FIG. 2 shows a portion of a parallelogram beam-type load cell 30, having strain gauges 31, 32, 33 and 34 located at predetermined positions thereon. The strain gauges 31–34 respond to a load 35 acting on the end portion 36 of the load cell, with gauges 32 and 33 responding to tension force and gauges 31 and 34 responding to compression force. The strain gauges are normally placed on the beams and connected into a Wheatstone bridge circuit, as shown in FIG. 4, such that the output of the bridge, when excited by a voltage source 25, is proportional to the shear force of the load, and ideally independent of the position of the load 35 relative to the positions of the strain gauges 31, 32, 33 and 34.

Theoretically, the shear component of load 35 (FIG. 2) exerted on the load cell results in surface strain ($S_s$) at the gauges, the magnitude of which can be calculated for a typical load cell as follows:

$$S_s = \frac{\pm 1.5 P l_1}{E b h^2}$$

where P = the weight of the load, i.e., 2,500 pounds, $l_1$ = 1.5 inches, b = 1 inch, E = Young's Modulus = 28 × $10^6$ psi, and h = 0.45 inches. These values are representative values of a conventional beam load cell, but are used for purposes of explanation only. From the above, $$S_s = \frac{1.5 \times 2500 \times 1.5}{(28 \times 10^6) \times 1 \times (0.45)^2}$$

$S_s \cong \pm 1000$ microstrain

Since the load 35 is located at a distance $l_2$ from the center line 37–37, a bending moment of strain ($S_m$) is also exerted on the strain gauges, the magnitude of which can be calculated as follows:

$$S_m = \frac{\pm P l_2}{E b h l_3}$$

where
$l_2$ = 3.86 inches, $l_3$ = 1.5 inches.
$S_m \cong \pm 500$ microstrain

In general, strain components of shear force and bending moment will be slightly different at each strain gauge location, because of slight differences in variables such as beam width (b) and beam height (h) at each gauge location.

The total bridge (FIG. 2) output voltage is expressed as a function of total strain and gauge factors as follows:

$$V_{OUT} = E_{in}/4[(gf_{31})(S_{31}) - (gf_{32})(S_{32}) - (gf_{33})(S_{33}) + (gf_{34})(-S_{34})]$$

where $gf_n$ = gauge factor of the particular strain gauge and $S_n$ = the total strain at each gauge.

The total strain $S_n$ at each strain gauge is then computed by summing the magnitudes of strain components due to shear force and bending moment at each strain gauge, with the proper algebraic signs.

| | |
|---|---|
| Compression Gauge 31 | $S_{31} = -(S_{s31} + S_{m31})$ |
| Tension Gauge 32 | $S_{32} = (S_{s32} + S_{m32})$ |
| Tension Gauge 33 | $S_{33} = (S_{s33} - S_{m33})$ |
| Compression Gauge 34 | $S_{34} = -(S_{s34} - S_{m34})$ |

These can now be summed using the following formulas to give the bridge output voltage ($V_{out}$) in terms of the bending component ($V_m$) and shear force component ($V_s$).

$$V_{out} = V_s + V_m$$

If we assume the gauge factor ($gf$) to be the same at each strain gauge, the shear and moment voltage components are:

$V_s = e_{in}(gf)/4 \; [-S_{s31} - S_{s32} - S_{s33} - S_{s34}]$
$V_m = e_{in}(gf)/4 \; [-S_{m31} - S_{m32} + S_{m33} + S_{m34}]$

Since from the preceding example all strains caused by shear force are approximately equal (1000 microstrain) and all strains caused by bending moment are also approximately equal (500 microstrain) it can be seen that the bending components of strain cancel under ideal conditions, and the shear force components add up as follows:

$V_m = 0$
$V_s = (e_{in})(gf)(S_s)$

Using $S_s$ as previously determined (1000 microstrain) and a gf of (2) for foil gauges, the total bridge output is then shown to be:

$V_s/e_{in} = 2 \;(1000 \times 10^{-6}) = 2 mv/v$

The individual gauge outputs from moment and shear force can be calculated as follows:

$V_s/e_{in} = gf/4 \; (S_s) = 0.5 \; mv/v$
$V_m/e_{in} = gf/4 \; (S_m) = 0.25 \; mv/v$

As seen from the cancellations in the above equations, the connection of strain gauges on a parallelogram-type beam load cell in a Wheatstone bridge circuit theoretically results in a cancellation of the bending moment outputs generated by the load. Only shear force then affects the output of the bridge. However, in actual practice, a residual bending moment output $\Delta V_m$ remains, either adding to or subtracting from the shear force results, depending on the specific configuration of the gauges, their placement on the beams, and the dimensional inconsistencies of the beam, as explained above. This is proven experimentally by moving the load location relative to the location of the strain gauges. Such movement results typically in inconsistent readings.

These effects are largely eliminated by means of the present invention, wherein a portion of at least one dimension of the two beams is physically reduced, as shown in FIG. 5, in accordance with a precise mathematical evaluation of the original beam load cell and strain gauge configuration. To accomplish this evaluation, the placement of the load 35 relative to the load cell is varied longitudinally both plus and minus a given distance $\Delta l_2/2$ from the nominal loading point 43 in FIG. 5. The location of the machined portions, as between one end (gauges 13 and 14) and the other end (gauges 15 and 16) is determined by experimentally locating which half of the bridge is providing the lower electrical output. This is accomplished by noting the change in output of the bridge, $\Delta V_m$, when the load 35 is moved from the leftmost load point 44 to the rightmost load point 45 relative to the beam structure. If the output of the bridge increases positively between positions 44 and 45, gauges 15 and 16 are providing an electrical output which is lower than gauges 13 and 14, while a negative change in output between load points 44 and 45 is indicative that gauges 13 and 14 are providing a lower electrical output than gauges 15 and 16. The two beams 19 and 20 are then machined at the location of that half of the bridge which is providing the lower electrical output. Thus, if the electrical output of the bridge changes negatively from load position 44 to load position 45, beams 19 and 20 will be machined at the axial location where gauges 13 and 14 are located, and vice versa.

Although the machining may be accomplished on various dimensional portions, it is often convenient to reduce the width of the beams, as shown in FIG. 5. The width of material machined from each beam is calculated as follows:

$$\text{Machined width } \Delta b = \frac{b(\Delta V_m/V_m)}{\Delta l_2/l_2}$$

where $\Delta V_m$ might typically be 0.001 $mv/v$, and from the previous example, $b = 1$ inch, $l_2 = 3.85$ inches, $\Delta l_2 = 0.25$ inches and $V_m = 0.25$ $mv/v$, then: $\Delta b = 0.06$ inches.

Thus, referring to FIG. 5, 0.06 inches must be machined from beams 19 and 20 at the axial location of strain gauges 13 and 14 on the beams, the axial or longitudinal dimension of the machined portion being approximately coincident with the axial dimension of the strain gauges. The material to be machined from each beam may be taken either completely from one side of each beam, or equally from both sides, or in some proportion between the two sides such that a total of 0.06 inches is removed. It is, however, generally preferable to remove material equally from both sides of the individual beams. Thus, portions 50, 51, 52 and 53, each 0.3 inches, will be machined from each edge of beams 19 and 20 in the vicinity of the position of strain gauges 13 and 14.

The machined portions 50, 51, 52 and 53 will extend entirely through the height ($h$) of the beam and inward of the beam the prescribed distance. The longitudinal or axial dimension of the machined portions is approximately coincident with the placement of the appropriate pair of strain gauges.

This reduction of the beam width at the proper location compensates for various physical inconsistencies of the beam-type load cell, including placement of the strain gauges on the beams, the differences in physical configuration between the two beams 19 and 20, and inconsistencies in operating characteristics between the individual strain gauges. These types of errors can only be compensated for experimentally, i.e., the load cell errors due to the above factors can only be determined by making actual, in place measurements with the operating load cell. By utilizing the aforementioned equations, portions of the beams may be machined in such a way, as described and shown, which results in a beam load cell which is in practicality insensitive to the bending moment of the load, while remaining sensitive to the shear force of the load. Desensitization of the load cell to the bending moment is thus accomplished without upsetting the individual strain gauge resistances, and in a relatively inexpensive manner as compared with using an external resistance network to achieve the desired electrical balance.

Although an exemplary embodiment of the invention has been disclosed herein for purposes of illustration, it will be understood that various changes, modifications, and substitutions may be incorporated in such embodiment without departing from the spirit of the invention as defined by the claims which follow.

What is claimed is:

1. A parallelogram beam-type load cell comprising:
   a pair of spaced, substantially parallel beams, each of said beams having a longitudinal axis, the corresponding ends of which pair of beams terminate in common planes;
   first means rigidly connecting a first pair of corresponding beam ends, and capable of accepting a mechanical mount for supporting a load; and
   second means rigidly connecting the opposing pair of corresponding beam ends, and capable of being connected to a fixed support structure, each of which pair of spaced beams includes a mounting surface for a plurality of electrical strain gauge means such that at least two said strain gauge means can be mounted on strain sensitive portions of each of said beams, each of said beams having defined therein a cutout portion in at least one surface thereof, said cutout portion having a selected position adjacent one and not the other of said strain gauge means on each of said pair of beams, said position being determinable and said cutout portion removed from each beam after said strain gauge means are operatively positioned on said pair of beams so that said load cell in operation is responsive substantially only to stresses acting perpendicularly to the longitudinal axis of said pair of beams.

2. A load cell in accordance with claim 1, wherein said cutout portions of said spaced beams are located in the vicinity of one pair of corresponding ends of said pair of beams.

3. A load cell in accordance with claim 2, wherein said cutout portion in each beam is substantially coextensive longitudinally with the longitudinal dimension of said one of said strain gauge means.

4. A load cell in accordance with claim 3, wherein each of said spaced beams has top and bottom substantially parallel surfaces, and opposing edge surfaces which connect said top and bottom surfaces, the bottom surface of one of said spaced beams facing the top surface of the other of said spaced beams and thereby comprising load cell beam interior surfaces, which beams have relatively narrow edge surfaces as compared to said top and bottom substantially parallel surfaces, said beam interior surfaces being said mounting surfaces for said plurality of electrical strain gauge means.

5. A load cell in accordance with claim 4, wherein said cutout portion on each of said beams is further defined as being disposed on at least one edge surface thereof, and is substantially longitudinally coextensive with the adjacent one of said strain gauge means.

6. A load cell in accordance with claim 5, wherein each said beam further includes an additional said cutout portion disposed on an edge surface opposite from said above named cutout portion and being substantially longitudinally coextensive with the adjacent one of said strain gauge means.

7. The load cell of claim 5, wherein said strain gauge means are adapted to be electrically connected to form a Wheatstone bridge, and wherein said beams each define a width dimension between said opposed edge surfaces and said cutout portions reduce said width dimension of each of said beams by an amount $\Delta b$ defined by the following formula:

$$\Delta b = \frac{b(\Delta V_m/V_{in})}{\Delta l_2/l_2}$$

where $b$ equals the width of said beam; $l_2$ equals a distance along said longitudinal axis between a predetermined normal load position on said mechanical mount and a longitudinal center of said beam; $\Delta l_2$ equals a distance along said longitudinal axis between said normal load position and a load position longitudinally spaced therefrom on said mount; $\Delta V_m$ equals a predetermined value resulting from a measured difference in an output voltage response of said bridge when a voltage is applied at an input thereof and when said load is moved between said normal position and said position longitudinally spaced therefrom; and $V_m$ equals a predetermined value resulting from a calculated change in a voltage response across one of said gauge means due to a bending moment caused by said load at said normal load position and when such gauge means is connected in said bridge and a voltage is applied at an input thereof.

8. The load cell of claim 1, wherein said cutout portions extend transversely across the beam surfaces on which said cutout portions are defined, and have a defined cross-sectional area, determinable only after said strain gauge means are operatively positioned on said pair of beams.

9. The load cell of claim 1, wherein said position and volume of said cutout portion is related to the polarity and quantity of change in bending moment response of said load cell to a change in position of said load on said mechanical mount.

10. A process of moment desensitization of a parallelogram beam-type load cell, which load cell includes a pair of spaced, substantially parallel beams, the adjacent ends of which terminate in common planes, with first means capable of accepting a mechanical mount for supporting a load rigidly connecting a first pair of adjacent beam ends, and second means capable of being connected to a fixed support structure rigidly connecting the opposing pair of adjacent beam ends, the process including the steps of:

positioning at least two strain gauges on strain sensitive portions of each of said beams;

connecting said strain gauges from both beams in a bridge, wherein said bridge, when energized, produces an electrical output signal response which is representative of a load force applied on the mechanical mount;

determining the response of the bridge and any changes therein in response to movement of the load on said mechanical mount; and removing a portion of each of said pair of beams in the vicinity of one and not the other of said strain gauges on each of said pair of beams, said removed portions having a position and volume dependent on the polarity of and quantity of change in the response of the bridge resulting from a known change in the position of said load on said mechanical mount.

11. A process of claim 10, wherein the position of said removed portions is determined by the polarity of change in response of the bridge resulting from said known change in position of said load on said mechanical mount.

12. A process of claim 10, wherein the volume of said removed portions is directly proportional to a change in bending moment response of said load cell from a change in position of said load on said mechanical mount, and inversely proportional to the distance of said change in load position producing said change in bending moment response.

13. A parallelogram beam-type load cell which is compensated for errors due to bending moments and which includes a pair of spaced, substantially parallel beams, each of said beams having adjacent ends terminating in common planes, with first means rigidly connecting a first pair of adjacent beam ends, which first means is capable of accepting a mechanical mount for supporting a load, and with a second means rigidly connecting the opposing pair of adjacent beam ends, which second means is capable of being connected to a fixed support structure, and a plurality of strain gauges located on strain sensitive portions of each said parallel beams; and load cell being compensated by:

a. connecting said strain gauges on both beams in a bridge, wherein said bridge when energized produces an electrical output signal response which is representative of a load force applied to said mechanical mount;

b. determining the response of the bridge and any changes therein in response to movement of the load on said mechanical mount; and c. removing a portion of each of said pair of beams in the vicinity of one and not the other of said strain gauges on each of said pair of beams, said removed portions having a position and volume dependent on the polarity of and quantity of change in the response of the bridge to a predetermined change in the position of said load on said mechanical mount, whereby said load cell in operation is responsive substantially only to stresses acting perpendicularly to the longitudinal axis of said pair of beams.

* * * * *